US 9,439,058 B2

(12) United States Patent
Barclay et al.

(10) Patent No.: US 9,439,058 B2
(45) Date of Patent: Sep. 6, 2016

(54) HOME SUBSCRIBER SERVER (71) Applicant: Alcatel Lucent, Boulogne-Billancourt (FR)

(72) Inventors: Deborah L Barclay, Winfield, IL (US); Bruno Landais, Pleumeur-Bodou (FR); Laurent Thiebaut, Antony (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/656,013

(22) Filed: Mar. 12, 2015

(65) Prior Publication Data

US 2015/0189491 A1 Jul. 2, 2015

Related U.S. Application Data

(63) Continuation of application No. 13/673,413, filed on Nov. 9, 2012, now Pat. No. 8,989,729.

(51) Int. Cl.
| | |
|---|---|
| *H04W 4/00* | (2009.01) |
| *H04W 8/04* | (2009.01) |
| *H04W 24/00* | (2009.01) |
| *H04W 24/08* | (2009.01) |
| *H04W 16/18* | (2009.01) |

(52) U.S. Cl.
CPC .............. *H04W 8/04* (2013.01); *H04W 4/005* (2013.01); *H04W 16/18* (2013.01); *H04W 24/00* (2013.01); *H04W 24/08* (2013.01); *Y02B 60/50* (2013.01)

(58) Field of Classification Search
CPC ..................................... H04W 24/08
USPC ....................... 455/422.1; 375/230
See application file for complete search history.

(56) References Cited

U.S. PATENT DOCUMENTS

| 8,989,729 | B2 * | 3/2015 | Barclay | ................. H04W 24/08 375/230 |
| 2010/0278042 | A1 * | 11/2010 | Monnes | .............. H04L 43/0894 370/230 |
| 2014/0134996 | A1 * | 5/2014 | Barclay | ................. H04W 24/08 455/422.1 |
| 2015/0189491 | A1 * | 7/2015 | Barclay | ................. H04W 24/08 455/422.1 |

OTHER PUBLICATIONS

International Preliminary Report on Patentability corresponding to PCT/US2013/067676 mailed May 12, 2015, 12 pages.
Huawei et al., "Updates for Monitoring via PCC and HSS", 3GPP Draft; S2-124447; SA WG2, Nov. 12, 2012, 6 pages.
Zte et al., "Report MTC Monitoring Event Using T5 and Tsp", 3GPP Draft; S2-124004; SA WG2, Oct. 12, 2012, 8 pages.
"3rd Generation Partnership Project; Technical Specification Group Services and System Aspects; Telecommunication Management; Subscriber and Equipment Trace; Trace Control and Configuration Management", 3GPP Standard; 3GPP TS 32.422; SA WG5, V11. 5.0, Sep. 21, 2012, 124 pages.

* cited by examiner

Primary Examiner — William D Cumming
(74) Attorney, Agent, or Firm — Davidson Sheehan LLP (57) ABSTRACT

Embodiments of the claimed subject matter provide a method for supporting network monitoring of user equipment events. Some embodiments of the method include receiving, at a home subscriber server (HSS) in a public land mobile network (PLMN), a request to monitor one or more events associated with one or more users. The request is used to configure, activate, or deactivate delivery of reports from one or more entities in the PLMN to a monitor collection entity in response to the event(s). Some embodiments of the method also include configuring one or more profiles in the HSS associated with the user(s) based on the request and providing the request to monitor the event(s) associated with the user(s) to one or more serving nodes for user equipment associated with the user(s).

6 Claims, 5 Drawing Sheets

Figure 1

| UE MONITORING PROFILE 200 | | | |
|---|---|---|---|
| IMSI | | IMEI-SV | |
| EVENT | ACTIVE? | ACTION | |
| Misaligned Behaviour | Yes | STOP | |
| Change in UE-UICC Association | Yes | STOP | |
| Loss of Connectivity | No | NONE | |
| ... | | | |
| Changed PoA | No | NONE | |

HOME SUBSCRIBER SERVER

CROSS REFERENCE TO RELATED APPLICATIONS

The present application is a continuation application of co-pending U.S. patent application Ser. No. 13/673,413, entitled "NETWORK MONITORING OF USER EQUIPMENT EVENTS" and filed on Nov. 9, 2012, the entirety of which is incorporated by reference herein.

BACKGROUND

This application relates generally to communication systems, and, more particularly, to wireless communication systems.

Wireless communication systems typically include a network of base stations that provide wireless connectivity to user equipment. User equipment may include devices such as cellular phones, smart phones, tablets, ultrabooks, laptops, wireless-enabled desktop computers, and the like. User equipment may also include machine type communication (MTC) devices. An MTC device is defined by the 3GPP TS 22.368 as user equipment equipped for Machine Type Communication. An MTC device can be one of the types of devices listed above (e.g., a smart phone) with an MTC application installed on it or the MTC device can be a device that is specific for an MTC purpose and communicates wirelessly to an MTC server, such as a water meter or health monitoring device. The MTC device communicates through a public land mobile network (PLMN) with MTC server(s) and/or other MTC device(s). Machine type communication is a form of data communication that involves one or more entities that do not necessarily need human interaction. A service optimised for machine type communications differs from a service optimised for human-to-human communications. For example, machine type communications differs from current mobile network communication services because machine type communication may involve different market scenarios, data communications, lower costs and effort, a potentially very large number of communicating terminals, and to a large extent, relatively little traffic per terminal.

SUMMARY OF EMBODIMENTS

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

Conventional wireless communication systems support functionality to trace events related to user equipment in the system. For example, 3GPP systems can trace the activities of a device in response to a triggering event such as activating a packet data protocol (PDP) context. Gathering trace events may be particularly important for devices that implement machine type communication, since machine type communication does not necessarily need human intervention. However, tracing events gathers information related to all the activities related to the trace event of the device, which can cause a large amount of information to be collected (such as all the signaling messages related to the event) even though much of this information may not be of interest. Tracing does not provide the ability to limit monitoring to a particular event related to user equipment and reporting that the event occurred. Nodes that carry out tracing requests are not configured to take any action in response to detecting events during the tracing. Furthermore, trace functionality is implemented internally to the public land mobile network (PLMN) and therefore does not support third-party requests for monitoring of devices within the network.

Other proposals for techniques for monitoring devices also have a number of drawbacks. For example, the Rx and Gx interfaces may be used to configure monitoring requirements in the packet Gateway (PGW) and to allow the PGW to send the monitoring events/notifications. However, transmitting the configuration information or the monitoring events/notifications over the control plane interfaces (Gx and Rx) and the policy charging and rules function (PCRF) induces load on the Gx/Rx/PCRF control plane capabilities, which may potentially cause starvation of control plane resources (and a corresponding service delivery degradation) when there are many monitoring events to report. For another example, associations between a user equipment's international mobile subscriber identity (IMSI) and its international mobile equipment identity (IMEI, IMEI-SV) may be checked at the home subscriber server (HSS) and reported to a monitoring entity with the aim of detecting new combination of IMEI-SV and IMSI, which may indicate the insertion of a universal subscriber identity module (USIM) in a different, potentially unauthorized or fraudulent device. For yet another example, a new T5 interface may be defined between the nodes serving the UE (such as the mobility management entity/serving GPRS support node (MME/SGSN)) in the visited PLMN (VPLMN) and the machine type communication interworking function (MTC-IWF) in the home PLMN (HPLMN). The T5 interface may be used to support monitoring in conjunction with the Tsp interface. However, this approach does not support the case of a serving node failure that would induce the loss of a monitoring request and furthermore requires the definition of a new inter-PLMN interface (T5) inducing new inter operator testing and operation costs. The disclosed subject matter is directed to addressing the effects of one or more of the problems set forth above.

In one embodiment, a method is provided for supporting network monitoring of user equipment events. Some embodiments of the method include receiving, at a home subscriber server (HSS) in a public land mobile network (PLMN), a request to monitor one or more events associated with one or more users. The request is used to configure, activate, or deactivate delivery of reports from one or more entities in the PLMN to a monitor collection entity in response to the event(s). Some embodiments of the method also include configuring one or more profiles in the HSS associated with the user(s) based on the request and providing the request to monitor the event(s) associated with the user(s) to one or more serving nodes for user equipment associated with the user(s).

In another embodiment, a method is provided for supporting network monitoring of events. Some embodiments of the method include receiving, at a network entity in a public land mobile network (PLMN) and from a home subscriber server (HSS), a request to monitor one or more events associated with one or more users. Some embodiments of the method also include configuring delivery of reports from the network entity to a monitor collection entity in response to the event(s). The request is received by the HSS in response to a request provided by an element management system (EMS) or a service capability server (SCS).

In yet another embodiment, a method is provided for supporting network monitoring of events. Some embodiments of the method include receiving, at a first node in a public land mobile network (PLMN) that serves user equipment associated with one or more users and from a home subscriber server (HSS), a request to monitor one or more events associated with one or more subscriptions associated with the user(s). Some embodiments of the method also include propagating the request towards one or more second nodes participating in PLMN service delivery to the user(s). The second node(s) are configurable to monitor one or more events associated with the subscription(s) on the basis of the request received from the first node.

In a further embodiment, a method is provided for supporting network monitoring of events. Some embodiments of the method include receiving, at a network entity in a public land mobile network (PLMN) that serves user equipment and from a home subscriber server (HSS), a request to monitor one or more events associated with a subscription associated with the user equipment. The request includes an address associated with a monitor collection entity. Some embodiments of the method also include detecting occurrence of one of the events and reporting the detected event to the monitor collection entity using the received address.

BRIEF DESCRIPTION OF THE DRAWINGS

The disclosed subject matter may be understood by reference to the following description taken in conjunction with the accompanying drawings, in which like reference numerals identify like elements, and in which.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. The description and drawings merely illustrate the principles of the claimed subject matter. It should thus be appreciated that those skilled in the art may be able to devise various arrangements that, although not explicitly described or shown herein, embody the principles described herein and may be included within the scope of the claimed subject matter. Furthermore, all examples recited herein are principally intended to be for pedagogical purposes to aid the reader in understanding the principles of the claimed subject matter and the concepts contributed by the inventor(s) to furthering the art, and are to be construed as being without limitation to such specifically recited examples and conditions.

The disclosed subject matter is described with reference to the attached figures. Various structures, systems and devices are schematically depicted in the drawings for purposes of explanation only and so as to not obscure the description with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition is expressly set forth in the specification in a definitional manner that directly and unequivocally provides the special definition for the term or phrase. Additionally, the term, "or," as used herein, refers to a non-exclusive "or," unless otherwise indicated (e.g., "or else" or "or in the alternative"). Also, the various embodiments described herein are not necessarily mutually exclusive, as some embodiments can be combined with one or more other embodiments to form new embodiments.

As discussed herein, conventional trace functionality and other proposals for monitoring devices in a wireless communication network have a number of significant drawbacks. At least in part to address or mitigate these drawbacks, embodiments of the techniques described herein allow service capability servers (SCS) to request monitoring of selected events for user equipment via the Tsp reference point between the SCS and an interworking function such as a machine type communication interworking function (MTC-IWF). The SCS can be internal or external to the PLMN. Some embodiments may store the monitoring configuration information provided by the SCS as part of the user equipment subscription information in the home subscriber server (HSS). Monitoring configuration information may also be dynamically provided by the SCS to configure, activate, or deactivate report delivery for monitoring events and user equipment. The monitoring configuration information may also be downloaded to other network entities (such as an SGSN or MME) together with the subscription information. When the monitoring configuration indicates that monitoring involves other nodes (e.g., Radio Access Nodes, serving gateway (SGW), packet gateway/gateway GPRS support node (PGW/GGSN)), the monitoring configuration may be transferred to the other nodes via new information added to existing protocols (e.g., S1 or S4/S11 and S5/S8 as defined in 3GPP specifications such as TS 23.401). Monitoring information collected in response to an event indicated in a monitoring request can be transmitted to a monitoring collection entity (MCE) via a monitoring collection interface and then stored in the monitoring collection entity. The SCS can be accessed by third-party content providers using application programming interfaces (APIs) and so third-party content providers may be able to request monitoring of scheduled events for user equipment via the SCS. The network provider may therefore support authentication and authorization of the monitoring requests as well as charging functionality to charge for the requested monitoring.

Figure 1:
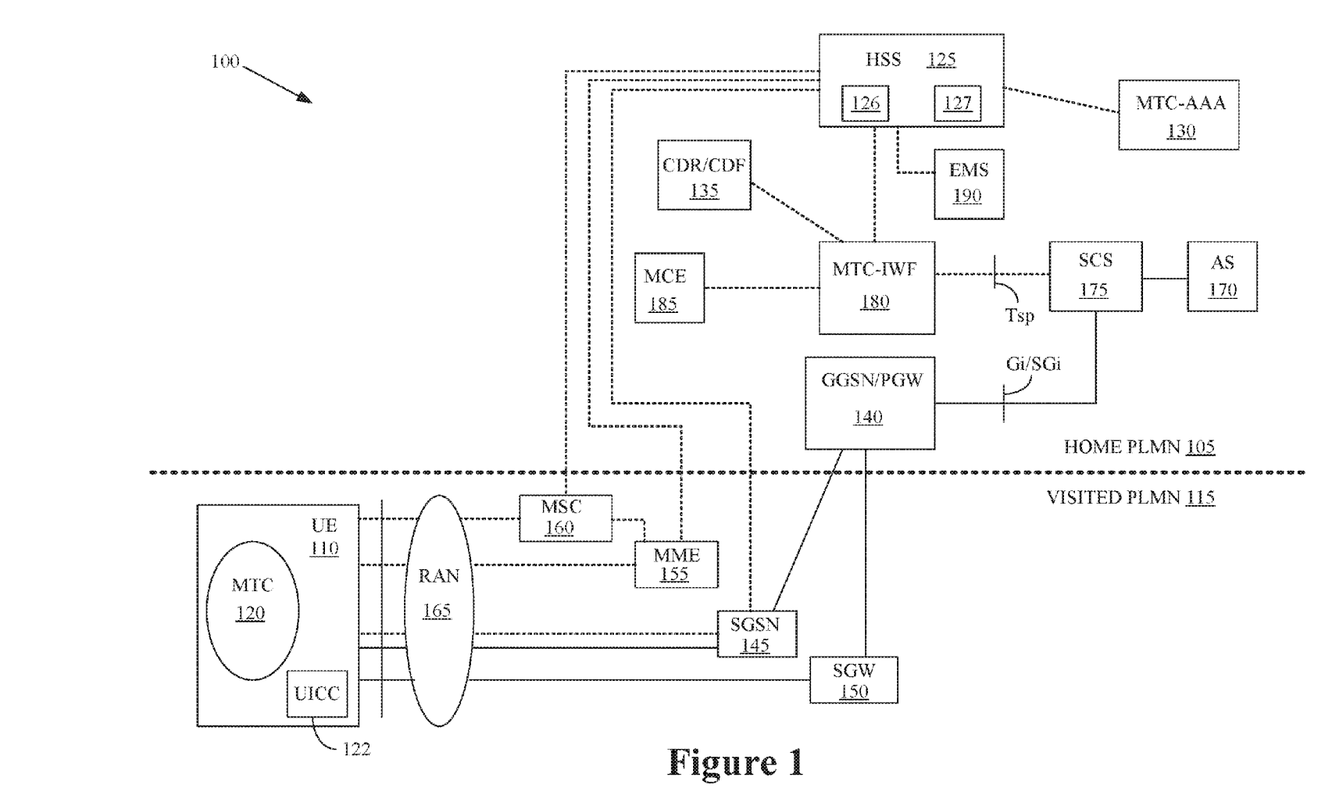
FIG. 1 conceptually illustrates one exemplary embodiment of a wireless communication system.

FIG. 1 conceptually illustrates one exemplary embodiment of a wireless communication system 100. In the illustrated embodiment, the wireless communication system 100 implements a public land mobile network (PLMN) although other networks may be implemented instead of or in addition to this type of network. Dotted line connections in FIG. 1 indicate control plane pathways and solid line connections indicate user plane pathways. The portions of the PLMN depicted in FIG. 1 include a home PLMN 105 for user equipment 110 and a visited PLMN 115. User equipment 110 is depicted in the visited PLMN 115. However, persons of ordinary skill in the art having benefit of the present disclosure should appreciate that user equipment 110 may be free to roam between the home PLMN 105, the visited PLMN 115, or other network areas that are not depicted in FIG. 1. Some embodiments of user equipment 110 may implement one or more MTC applications 120. As discussed herein, the MTC application 120 performs machine type communication, which is a form of data communication that involves one or more entities that do not necessarily need human interaction. However, persons of ordinary skill in the art having benefit of the present disclosure should appreciate that other embodiments of the wireless communication system 100 may include user equipment 110 that do not implement MTC applications 120. Persons of ordinary skill in the art having benefit of the present disclosure also appreciate that some embodiments of the techniques described herein may be used for monitoring devices that are not Machine Type devices. For example, some embodiments of the techniques described herein may be used to configure monitoring of events associated with smartphones.

Some embodiments of the user equipment 110 may implement a smartcard such as a universal integrated circuit card (UICC) 122 that may be used in mobile terminals in GSM and UMTS networks. The UICC 122 may be used to ensure the integrity and security of personal data and it typically holds a few hundred kilobytes. Specifications for the UICC 122 are found in ETSI TR 102 216. In a GSM network, the UICC 122 contains a subscriber identity module (SIM) application and in a UMTS network it is the USIM application. Some embodiments of the UICC 122 may contain several applications so that the UICC 122 can support access to both GSM and UMTS networks and provide storage of a phone book and other applications.

The home PLMN 105 shown in FIG. 1 includes a home subscriber server (HSS) 125. The HSS 125, which may also be referred to as a User Profile Server Function (UPSF), is a master user database that supports network entities that handle calls or data transmissions to or from user equipment 110. Some embodiments of the HSS 125 contain a memory 126 for storing subscription-related information such as subscriber profiles associated with the user equipment 110. The HSS 125 also includes a computer system 127 to manipulate and transform data represented as physical, electronic quantities within the memory 126. The HSS 125 may also perform authentication and authorization of the user and can provide information about the subscriber's location and IP information. Techniques for implementing or operating the HSS 125 are known in the art and only those aspects of implementing or operating the HSS 125 that are relevant to the claimed subject matter are discussed herein.

The HSS 125 is physically, electromagnetically, or communicatively coupled to an authentication, authorization, and accounting server (AAA) 130. Authentication refers to the process of authenticating user equipment 110 or other entities, typically on the basis of a specific digital identity such as an identifier and the corresponding credentials. Examples of types of credentials are passwords, one-time tokens (such as used as part of the EAP-AKA type of authentication using the Authentication and Key Agreement type of algorithm defined by 3GPP), or digital certificates. The authorization function determines whether a particular entity is authorized to perform a given activity, typically inherited from authentication when logging on to an application or service. Authorization may be determined based on a range of restrictions such as time-of-day restrictions, or physical location restrictions, or restrictions against multiple accesses by the same entity or user. Accounting refers to the tracking of network resource consumption by user equipment 110 or other entities for the purpose of capacity and trend analysis, cost allocation, or billing. In the illustrated embodiment, the AAA server 130 may include functionality for performing authentication, authorization, or accounting for user equipment 110 or MTC applications 120.

The home PLMN 105 may also include a charging data function (CDF) 135 that stores call detail records (CDR). The (CDF) addresses may be used for offline billing or online billing. The CDRs may be used to collect usage or billing information, which may then be sent to the billing system of the domain. Billing systems in different domains may exchange information so that roaming charges can be applied. Some embodiments of the CDF 135 may be used to track resource usage associated with monitoring events so that requested event monitoring can be billed to third parties.

A gateway general packet radio service (GPRS) support node (GGSN) 140 may be implemented in the home PLMN 105. The GGSN 140 supports a Gn interface and supports the GPRS tunneling protocol. The GGSN 140 is responsible for the interworking between the GPRS network and external packet switched networks, like the Internet. The GGSN 140 may also support a packet data network (PDN) gateway (PGW) function such as the PGW function defined in 3GPP TS 23.401 that supports a S5/S8 interface and supports the GPRS tunneling protocol. The PGW/GGSN 140 provides connectivity from user equipment 110 to external packet data networks by being the point of exit and entry of traffic for user equipment 110. The PGW 140 performs policy enforcement, packet filtering for each user, charging support, lawful interception, and packet screening. The PGW 140 may also act as the anchor for mobility between 3GPP and non-3GPP technologies such as WLAN (Wi-Fi) and 3GPP2 (e.g., code division multiple access (CDMA) 1× and evolution data optimized (EvDO)).

A serving GPRS support node (SGSN) 145 may be implemented in the visited PLMN 115. The SGSN 145 is responsible for the delivery of data packets from and to the mobile stations within its geographical service area, such as user equipment 110. Tasks supported by the SGSN 145 include packet routing and transfer, mobility management (attach/detach and location management), logical link management, and authentication and charging functions. The visited PLMN 115 also includes a serving gateway (SGW) 150. The SGW 150 routes and forwards user data packets, while also acting as the mobility anchor for the user plane during inter-eNodeB handovers. For idle state user equipment 110, the SGW 150 terminates the downlink data path and triggers paging when downlink data arrives for user equipment 110. The SGW 150 may also manage or store user equipment contexts, e.g. parameters of the IP bearer service, network internal routing information, and perform replication of the user traffic in case of lawful interception.

The visited PLMN 115 shown in FIG. 1 includes a mobility management entity (MME) 155. The MME 155 may be a control-node for the LTE access network and may be responsible for idle mode tracking and paging of the user equipment 110. The MME 155 may also be involved in the bearer activation/deactivation process and may be responsible for choosing the SGW 150 for user equipment 110 at the initial attach and at time of intra-LTE handover involving Core Network (CN) node relocation. The MME 155 may also be responsible for authenticating user equipment 110 by interacting with the HSS 125. A mobile switching center (MSC) 160 processes requests for service connections from user equipment 110.

The visited PLMN 115 shown in FIG. 1 also includes a radio access network (RAN) 165 that implements the radio access technology used to provide wireless connectivity to user equipment 110. Some embodiments of the radio access network 165 may include base stations, e-nodeBs (ENBs), base station routers, access points, femtocells, and the like. In the illustrated embodiment, the wireless communication system 100 supports control plane interfaces between the HSS 125 in the home PLMN 105 and the MSC 160, MME 155, and SGSN 145 in the visited PLMN 115.

Application servers 170 may interact with the wireless communication system 100 via service capability servers (SCS) 175. For example, third-party content providers may use one or more application servers 170 to access the capabilities of the wireless communication system 100 through Application Programming Interfaces (APIs) supported by the application servers 170. Some embodiments of the SCS 175 may be implemented externally to the PLMN, while other embodiments of the SCS 175 may be implemented internal to the PLMN. The SCS 175 may then communicate with other entities in the home PLMN 105 or the visited PLMN 115 via an interface (such as a Tsp interface) to the interworking function (IWF) 180 or an interface (such as a Gi/SGi) interface to the GGSN/PGW 140. In the illustrated embodiment, the IWF 180 may support machine type communication. The IWF may also support or control interfaces between the home PLMN 105 and the visited PLMN 115.

The wireless communication system 100 depicted in FIG. 1 also includes an element management system (EMS) 190 that is physically, electromagnetically, or communicatively coupled to the HSS 125. The EMS 190 provides a package of end-user functions for management of a set of closely related types of network elements, as specified in 3GPP TS 21.905. Some embodiments of the EMS 190 or the application server 170 may provide requests to monitor events associated with user equipment 110 or the MTC application 120. Some embodiments of the requests may be used to configure, activate, or deactivate delivery of event reports from entities in the home PLMN 105 or visited PLMN 115 to a monitor collection entity (MCE) 185. For example, the EMS 190 may provide a request to the HSS 125 to monitor events associated with the MTC application 120. The request may be determined based on a service provider agreement with the application provider for the SCS 175 or MTC application 120. For another example, the application server 170 may provide a request to monitor events associated with the MTC application 120 to the SCS 175, which may forward the request to the MTC-IWF 180. If the MTC-IWF 180 authorizes the request, the MTC-IWF 180 may then forward the information in the request to the HSS 125. In either case, the HSS 125 may use information in the request to configure a user profile or user subscription associated with user equipment 110 or the MTC application 120. The user profile may include information identifying the events to be monitored, as well as potentially indicating actions to be taken in response to detecting the event. Thus, in some embodiments, the events may be associated with a user or a user's subscription instead of (or in addition to) being associated with user equipment 110 or MTC application 120. This information may then be distributed to network entities, e.g. as part of a subscription download procedure.

In one embodiment, the monitoring configuration information may be statically stored in the HSS 125 as part of the subscription for user equipment 110 or the MTC application 120. This may apply to HPLMN based monitoring features. The monitoring configuration information may also be dynamically provided by the SCS 175. For example, the SCS 175 may send requests to the MTC-IWF 180 to configure, activate, or deactivate report delivery for a particular monitoring event and a particular user equipment 110, MTC application 120, or group of user equipment/applications. After the MTC-IWF 180 has validated the request, the MTC-IWF 180 may provide updated subscription data to the HSS 125. The monitoring configuration information may also be downloaded by the HSS 125 to network entities serving the user equipment 110 such as the SGSN 145 or the MME 155 during a location update or Insert Subscriber data procedure. When the monitoring request requires the involvement of other nodes (e.g. ENB/RAN 165, SGW 150, or PGW/GGSN 140), the SGSN 145 or the MME 155 may propagate the monitoring request information towards these nodes. For example, the monitoring request information may be provided using connection related signaling such as GTP-c (e.g. 3GPP TS 29.274) or signaling associated with an UE (e.g. over the S1 or IU interfaces) from the Serving Node (MME or SGSN) to the Radio Access Network (e.g. eNB, RNC, . . . ). Even if the serving SGSN 145 or MME 155 node fails or is changed due to mobility, the delivery of subscriber data may ensure that the new serving node receives the monitoring requirements. Monitoring requirements may also be sent to the PGW 140 from AAA server 130 over the S6b interface to support cases where such information cannot be transferred over user connection related signaling (e.g. in case proxy mobile IPv6 (PMIP) is used to contact the PGW) as in some cases of non-3GPP access to the evolved packet core (EPC).

Some embodiments of the monitoring configuration information may contain the Internet Protocol (IP) address of the MCE 185 so that network entities can report the events by addressing them to the MCE 185. Some embodiments may also support the event monitoring feature in the roaming scenario, in which case a Monitoring Collection Interface may be deployed to support roaming, e.g. by providing an interface for carrying reports between the MCE 180 in the home network and the roaming network. The configured network entities may then monitor activities of user equipment 110 or the MTC application 120 to detect the events indicated in the user profile. The configured network entities may generate reports in response to detecting one or more of the events indicated in the request and the reports may be delivered to the monitor collection entity 185.

Configuring the event-specific monitoring of events associated with users, user subscriptions, user equipment 110, or the MTC application 120 may allow network operators or third party application providers to monitor specific events related to users, user subscriptions, user equipment 110, or MTC application 120. The monitoring and reporting of event-specific information may aid in early detection of problems with user equipment 110 or MTC application 120. Some events can also aid in determining whether user equipment 110 or MTC application 120 is being vandalized or stolen. Furthermore, embodiments of the techniques described herein do not require creation of new inter-PLMN interfaces to configure the monitoring or report the monitoring events. Some embodiments of the event monitoring may be implemented without loading the signaling interfaces with monitoring events.

Some embodiments of the wireless communication system 100 may also support charging of third parties for monitoring services. For example, information indicating that user equipment 110 or MTC application 120 is associated with one or more event monitoring services may be provided to the CDF 135 and stored in an associated CDR. Resource usage associated with the event monitoring may be recorded by the CDF 135 using information provided by other network entities and the resource usage may be used for billing purposes.

Figure 2:
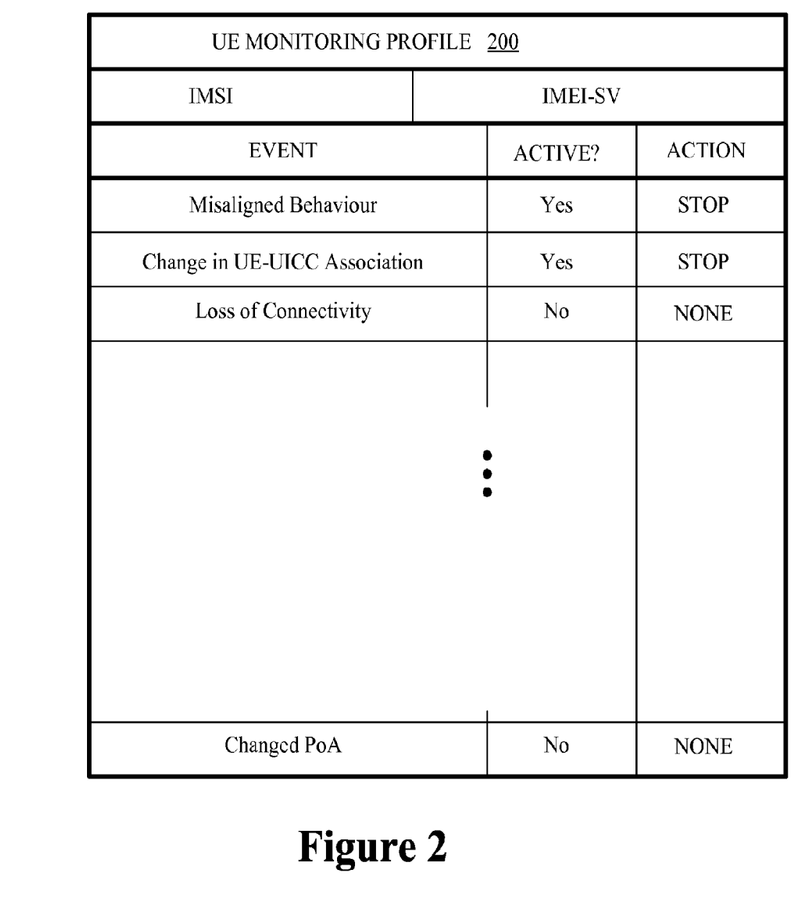
FIG. 2 conceptually illustrates one exemplary embodiment of a user equipment monitoring profile that may be created, configured, modified, or stored by a home subscription server (HSS)

FIG. 2 conceptually illustrates one exemplary embodiment of a user equipment monitoring profile 200 that may be created, configured, modified, or stored by a home subscription server (HSS). Some embodiments of the profile 200 may be created in response to the application server 170 shown in FIG. 1 transmitting a monitoring request to the SCS 175, which may provide information in the request to the HSS 125 via the MTC-IWF 180, as discussed herein. Some embodiments of the profile 200 may be created in response to the EMS 190 shown in FIG. 1 transmitting a monitoring request to the HSS 125. The profile 200 includes the IMSI and IMEI-SV that are used to identify the user equipment associated with the profile. However, some embodiments of the profile 200 may not include both the IMSI and the IMEI-SV and may instead use either the IMSI or the IMEI-SV or some other identifier to identify the user equipment.

The profile 200 also includes information indicating one or more events associated with the user, the user's subscription, the user equipment, or an MTC application that may be monitored. In the illustrated embodiment, the monitoring profile 200 includes information indicating that network entities may monitor activities associated with the user equipment to detect events indicating behavior that is not aligned with activated MTC feature(s), events indicating a change of the association between user equipment and the UICC installed in the user equipment, or loss of connectivity between the user equipment and the network. Loss of connectivity means it is no longer possible to establish signaling between the user equipment (or associated MTC application) and the network, e.g., when the user equipment is detached from the network. In one embodiment, the maximum time between the time at which the actual loss of connectivity occurred and the time at which the network entity identifies an event indicating the loss of connectivity may be configurable per subscription. For example, the maximum detection time that elapses before the network entity concludes that loss of connectivity has occurred may be configured to be on the order of 1 minute to 1 hour. Some embodiments of the monitoring profile 200 may also include information indicating that network entities should monitor activities associated with the user equipment to detect communication failure events and reasons for the failure events (e.g., connection error codes for troubleshooting), change of the location of the user equipment, change of the geographical position of the user equipment, or change of the point of attachment in the network of the user equipment. Persons of ordinary skill in the art having benefit of the present disclosure should appreciate that this exemplary list of monitoring events is not intended to be exhaustive and some embodiments may define or monitor other events that are not listed herein.

Some embodiments of the profile 200 may also include information indicating whether monitoring of a particular event has been activated. For example, the profile 200 depicted in FIG. 2 indicates that monitoring of events indicating misaligned behavior and changes in the UE-UICC association have been activated. Monitoring of events indicating loss of connectivity or a change in the point-of-attachment of the user equipment have not been activated in the embodiment of the profile 200 depicted in FIG. 2. Monitoring of user equipment events may be activated or deactivated using information provided by application servers. For example, the application server 170 shown in FIG. 1 may provide a monitoring request to activate monitoring of events related to loss of connectivity in the user equipment associated with the profile 200. Monitoring of user equipment events may also be activated or deactivated using information provided by EMS 190. The request may be forwarded to the HSS 125, which may then modify the profile 200 to activate monitoring of events associated with loss of connectivity.

In the illustrated embodiment, a subscriber may be able to define which of the above events should be monitored and detected. For example, upon detecting one of the active events indicated in the profile 200, an MTC subscriber may indicate that the network should provide a warning notification to an associated MTC server. Some embodiments of the profile 200 may also include information that indicates actions that may be taken in response to detecting the events listed in the profile 200. For example, the network may be configured to limit the services provided to the MTC device, e.g. by reducing the resources allocated to the user equipment in response to detecting certain events. The subscriber or user may also be able to define what actions may be taken when an event is detected. Some embodiments of the MTC device may be able to transfer other event notifications to the MTC server when the event detection is out of 3GPP scope, for example, notifications that indicate that the MTC device power level is lower than a threshold or the loss of signal reception. Loss of signal reception refers to a situation when a MTC device can no longer receive the network which could be due to interference (e.g. from a jammer or other source) or other reasons.

The profile 200 may include information indicating one or more actions that may be undertaken by the monitoring entity in response to detecting the event. For example, the profile 200 shown in FIG. 2 includes information indicating whether the service provided to the user should be stopped in response to detecting the event. The profile 200 indicates that the server should be stopped in response to detecting misaligned behavior or a change in the UE-UICC association. The profile 200 also indicates that the server should not take any action in response to detecting loss of connectivity or a change point for the user equipment. However, persons of ordinary skill in the art having benefit of the present disclosure should appreciate that the actions depicted in FIG. 2 are exemplary and some embodiments may include information indicating different actions or combinations of actions that are to be performed in response to detecting the different events.

Figure 3:
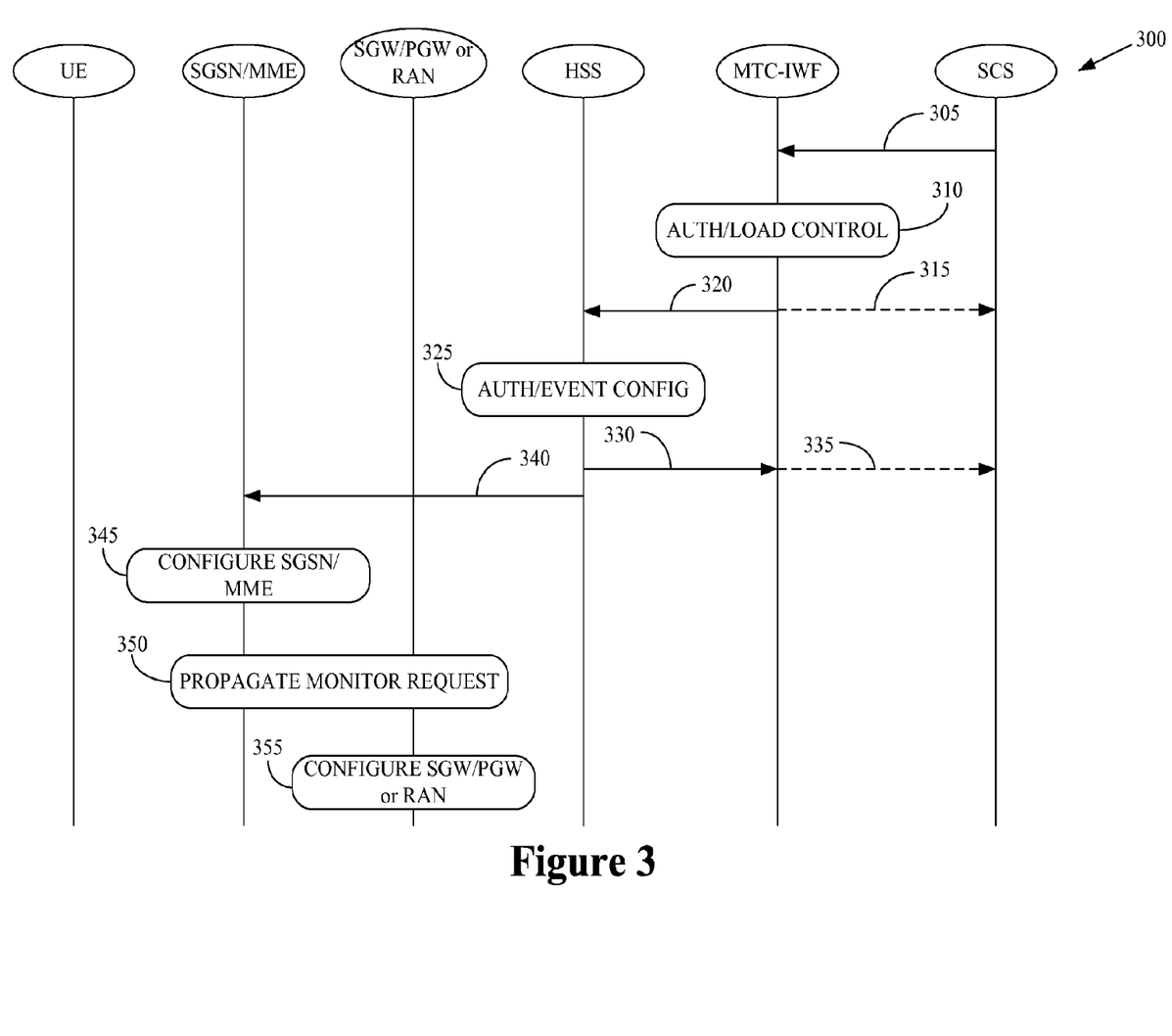
FIG. 3 conceptually illustrates a first exemplary embodiment of a method for configuring event monitoring in a wireless communication system.

FIG. 3 conceptually illustrates a first exemplary embodiment of a method 300 for configuring event monitoring in a wireless communication system. Some embodiments of the method 300 may be implemented in entities deployed in the wireless communication system 100 shown in FIG. 1 such as user equipment 110, SGSN 145, MME 155, SGW 150, PGW 140, HSS 125, MTC-IWF 180, and SCS 175. In the illustrated embodiment, the SCS sends (at 305) a Monitoring Action Request message over the Tsp interface to the MTC-IWF with the Action Type field in the message set to a value that indicates whether report delivery for a particular monitoring event is to be configured, activated, or deactivated. The SCS may also provide (at 305) information in the monitoring request message such as the identity of the device to monitor or of a group of devices to monitor. For example, the identifying information may correspond to external identities that may be translated to PLMN identities (e.g. IMSI). The SCS may also provide (at 305) information indicating a monitoring reference, the IP address of a monitoring collection entity (such as the MCE 185 shown in FIG. 1), a list of events to monitor (which may be indicated by one or more Monitoring Event IDs), and optionally an associated action to carry out in response to the event. For example, information may indicate that a network entity should report a detected event, cancel the service in response to detecting the event, disable the device in response to detecting the event, or some other action.

The MTC-IWF determines (at 310) whether the SCS is authorized to send monitoring requests and determines (at 310) whether the SCS has exceeded its quota or rate of submitting monitoring requests over Tsp, e.g., the MTC-IWF performs (at 310) load control for the SCS. If either determination fails (at 310), the MTC-IWF sends (at 315) a Monitoring Action Answer message with a cause value indicating the reason for the failure condition and the flow stops at step 315. Otherwise, the flow continues with step 320.

The MTC-IWF sends (at 320) a Subscriber Information Request message to the HSS/home location register (HLR) to authorize (at 325) the monitoring configuration details. For example, the HSS may authorize (at 325) the monitoring event ID provided in the subscriber information request message. If the HSS authorizes (at 325) the monitoring configuration details, the HSS may then configure (at 325) event monitoring for the user equipment. Some embodiments of the HSS may translate the external identifier into an internal identifier (IMSI), if necessary, and then the monitoring events may be configured (at 325) in the HSS as part of the user equipment subscription data. For example, the HSS may create, configure, modify, or remove the user profile that includes the event reporting information, as discussed herein. The HSS may also verify (at 325) the monitoring event information and authorize (at 330) the MTC-IWF to configure the network element for monitoring.

If this check fails, the MTC-IWF may receive (at 330) a negative feedback from the HSS and send (at 335) a Monitoring Action Answer message with a cause value indicating the reason for the failure condition. In this case the flow stops at step 335. Otherwise, the flow continues at step 340.

The HSS may download (at 340) monitoring configuration information to the SGSN/MME. For example, the HSS may download (at 340) MTC Monitoring configuration information to the SGSN/MME as part of a user equipment subscription download procedure, e.g. during an Attach/routing area update (RAU)/tracking area update (TAU) procedure or as part of an Insert Subscriber Data procedure initiated by the HSS towards the nodes serving user equipment that are subject to monitoring. For example, the monitoring event information may be propagated (at 340) from the HSS to the MME by including the information in enhanced trace configuration parameters of the S6a-Insert subscriber data message or the S6a-Update Location Answer message. For another example, the monitoring event information may be propagated (at 340) from the HSS to the SGSN by including the information into enhanced trace configuration parameters of the MAP-ACTIVATE_TRACE_MODE message. Some embodiments of the SGSN may further propagate monitoring event information to other nodes such as the GGSN by sending a GTP-CREATE_PDP_CONTEXT_REQUEST message or an UPDATE_PDP_CONTEXT_REQUEST for events that are activated while the PDP context is active. Some embodiments of the MME and SGSN may further propagate monitoring event information to other nodes such as SGW or/and PGW by sending a GTPv2-C CREATE SESSION REQUEST message or an enhanced TRACE SESSION ACTIVATION message (for events activated while the PDN connection is established) over the S11/S4 and S5/S8 interfaces.

Some embodiments of the monitoring configuration may include information identifying the device to monitor (e.g., an IMSI), an IP address of the MCE, or a monitoring reference and information allowing the MCE to associate the monitoring reference with the (MTC) service being monitored. This information may be opaque to the PLMN nodes reporting monitoring events but may be provided when sending notifications to the MCE. The HSS may also download (at 340), for each of the nodes that are required to monitor events, a list of events to monitor and optionally information indicating one or more actions to carry out in response to detecting one or more events in the list. For example, the HSS may download (at 340) information indicating that the network entity should report the event, cancel the service in response to detecting the event, or take some other action.

The SGSN/MME may then be configured (at 345) using the information downloaded (at 340) from the HSS. The configured SGSN/MME may then be able to monitor activities associated with the user equipment to detect one or more of the events indicated in the monitoring configuration information. In some embodiments, the target SGSN/MME may receive MTC Monitoring configuration when the serving SGSN/MME changes, e.g., during handover of user equipment. The MTC monitoring configuration may be stored in the user equipment context and exchanged between source and target SGSNs/MMEs or the target SGSN/MME may fetch the MTC monitoring configuration information from the HSS as part of subscriber data.

Some embodiments may support monitoring events that involve monitoring at nodes in addition to or instead of the SGSN/MME. The monitoring configuration information may therefore be propagated (at 350) towards other nodes (e.g. the ENB/RAN 165, SGW 150, or PGW/GGSN 140 shown in FIG. 1). For example, the serving node (SGSN/MME) may transmit (at 350) a request to monitor events associated with the user equipment to one or more additional serving nodes. The request may ask the additional serving node to monitor the same events that are being monitored by the serving node (SGSN/MME) or the request may be to monitor a subset of the events that are being monitored by the serving node (SGSN/MME). Embodiments of the request may include information identifying the events, an address of the monitoring collection entity for transmitting/collecting event reports, or possible actions to be taken in response to the event. The additional nodes (e.g. the ENB/RAN 165, SGW 150, or PGW/GGSN 140 shown in FIG. 1) may then be configured (at 355) using the information in the request. The additional nodes may also further propagate the requests to other nodes in the same manner.

Figure 4:
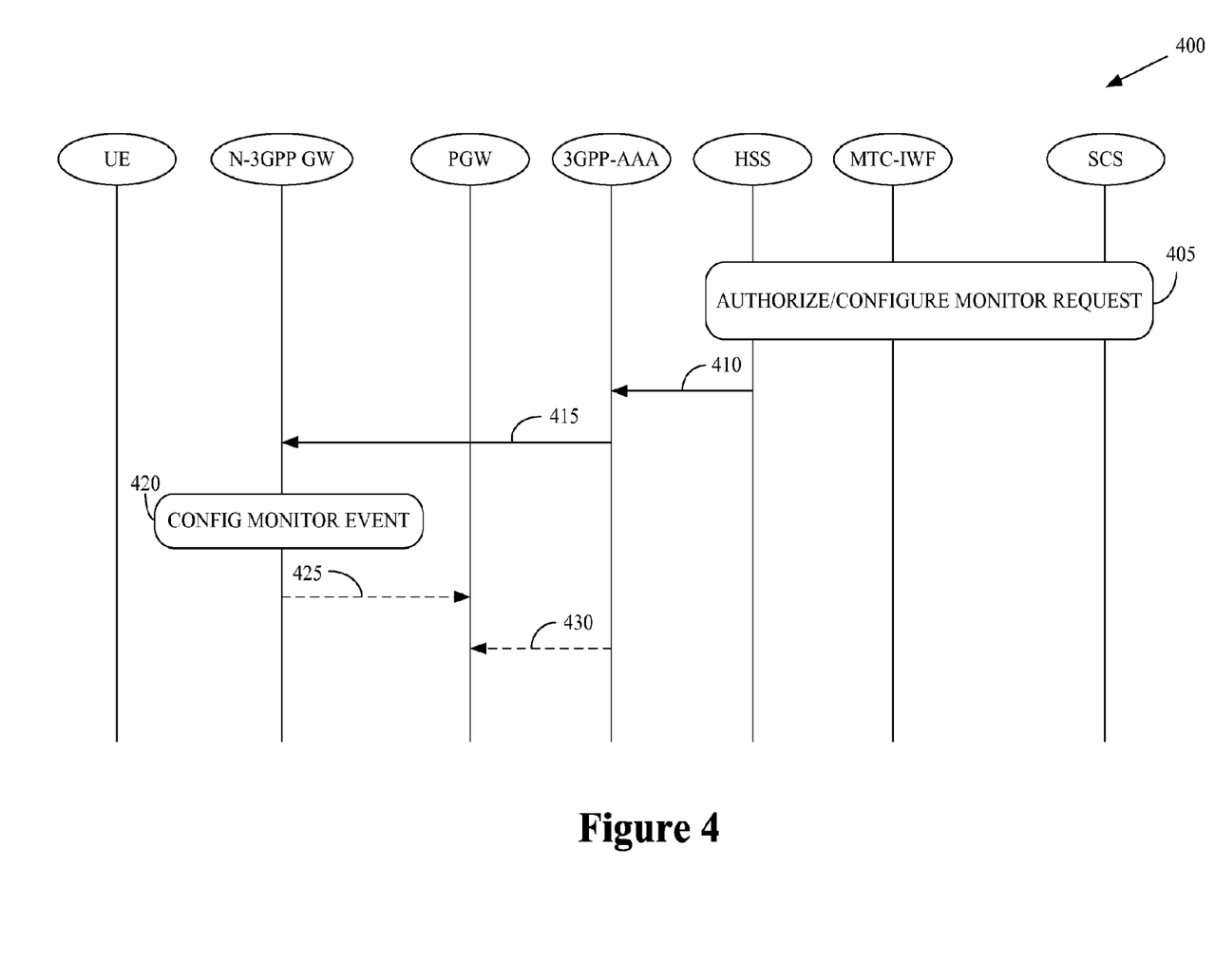
FIG. 4 conceptually illustrates a second exemplary embodiment of a method for configuring event monitoring in a wireless communication system for embodiments in which the user equipment is served by a non-3GPP access network such as a wireless local area network (WLAN) or as a cdma2000 network.

FIG. 4 conceptually illustrates a second exemplary embodiment of a method 400 for configuring event monitoring in a wireless communication system. Some embodiments of the method 400 may be implemented in entities deployed in the wireless communication system 100 shown in FIG. 1 such as user equipment 110, PGW 140, AAA 130, HSS 125, MTC-IWF 180, and SCS 175. However, the second exemplary embodiment differs from the first exemplary embodiment shown in FIG. 3 because the user equipment is accessing the wireless communication system via non-3GPP network elements. In the illustrated embodiment, an event monitoring request is provided by the SCS, e.g., in response to a request from a third party application server. The event monitoring requests may be authorized (at 405) and used to configure (at 405) the user profile in the HSS, as discussed herein. Some embodiments of the authorization/configuration process (at 405) may proceed in a manner analogous to steps 305, 310, 315, 320, 325, 330, 335 shown in FIG. 3.

Once the HSS has been updated (at 405) with the configuration data for the user equipment, as indicated in the monitoring request message received from the SCS, and the 3GPP AAA server has registered in the HSS as serving the user equipment for either a trusted or un-trusted non-3GPP access, the HSS updates (at 410) the 3GPP AAA server by providing the monitoring configuration data over an interface such as the SWx interface. Alternatively, the HSS may provide (at 410) the monitoring configuration data to the 3GPP AAA server in response to the HSS receiving a request to register the 3GPP AAA Server serving this user equipment for a trusted or un-trusted non-3GPP access.

The 3GPP AAA server may then provide (at 415) monitoring configuration data to a Non-3GPP Access Gateway such as a high rate packet date (HRPD) serving gateway (HSGW) or cdma2000, a TWAN for Trusted WLAN, an ePDG for non-trusted access to 3GPP, and the like. For example, the 3GPP AAA server may provide (at 415) the monitoring configuration data as part of user equipment subscription download procedure (e.g. during the Authentication and Authorization procedure) or as part of a Re-Authorization procedure initiated by the 3GPP AAA server (e.g., when the 3GPP AAA server receives the monitoring configuration data during an on-going non-3GPP Access session). If the monitoring requires the involvement of a PGW and a GTP based interface to the PGW is supported, the non-3GPP Access Gateway may propagate (at 425) the monitoring configuration data propagated towards these nodes over an interface such as the S2a/S2b interface. When the monitoring requires the involvement of the PGW and a PMIP based interface to the PGW is supported, the 3GPP AAA server may provide (at 430) the monitoring configuration data over an interface such as the S6b interface.

Figure 5:
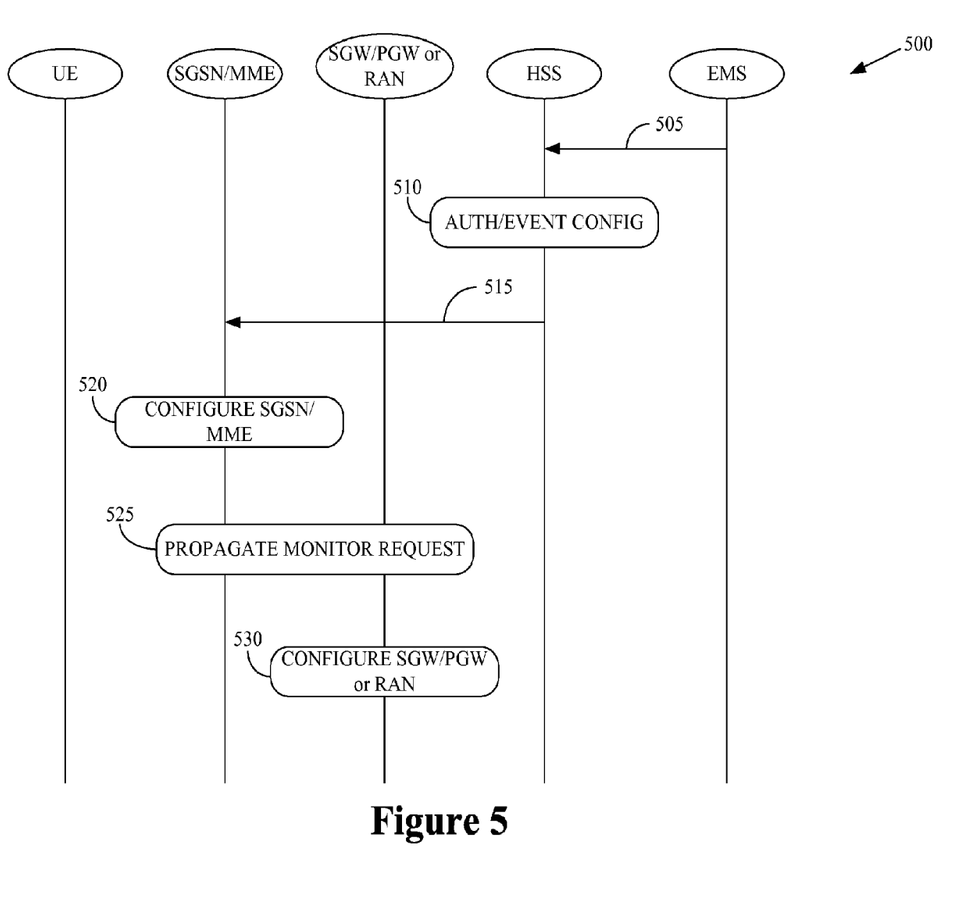
FIG. 5 conceptually illustrates a third exemplary embodiment of a method for configuring event monitoring in a wireless communication system in which event monitoring information is provided by an element management server.

FIG. 5 conceptually illustrates a third exemplary embodiment of a method 500 for configuring event monitoring in a wireless communication system. Some embodiments of the method 500 may be implemented in entities deployed in the wireless communication system 100 shown in FIG. 1 such as user equipment 110, SGSN 145, MME 155, SGW 150, PGW 140, HSS 125, and EMS 190. In the illustrated embodiment, the EMS sends (at 505) a request message to the HSS/HLR to authorize (at 510) the monitoring configuration details. For example, the HSS may authorize (at 510) the monitoring event ID provided in the request message. If the HSS authorizes (at 510) the monitoring configuration details, the HSS may then configure (at 510) event monitoring for the user equipment. For example, the HSS may create, configure, modify, or remove a user profile that includes the event reporting information, as discussed herein.

The HSS may download (at 515) monitoring configuration information to the SGSN/MME. For example, the HSS may download (at 515) MTC Monitoring configuration information to the SGSN/MME as part of a user equipment subscription download procedure or other process, as discussed herein. Some embodiments of the monitoring configuration may include information identifying the device to monitor (e.g., an IMSI), an IP address of the MCE, or a monitoring reference and information allowing the MCE to associate the monitoring reference with the (MTC) service being monitored. The HSS may also download (at 515), for each of the nodes that are required to monitor events, a list of events to monitor and optionally information indicating one or more actions to carry out in response to detecting one or more events in the list. For example, the HSS may download (at 515) information indicating that the network entity should report the event, stop the service in response to detecting the event, or take some other action.

The SGSN/MME may then be configured (at 520) using the information downloaded (at 515) from the HSS. The configured SGSN/MME may then be able to monitor activities associated with the user equipment to detect one or more of the events indicated in the monitoring configuration information, as discussed herein. Some embodiments may support monitoring events that involve monitoring at nodes in addition to or instead of the SGSN/MME. The monitoring configuration information may therefore be propagated (at 525) towards other nodes, as discussed herein. The additional nodes may then be configured (at 530) using the information in the request. The additional nodes may also further propagate the requests to other nodes in the same manner.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A home subscriber server (HSS) for deployment in a public land mobile network (PLMN), the HSS comprising:
   a memory; and
   a computer system configured to:
      receive a request to monitor at least one event associated with at least one user, wherein the request includes information for controlling delivery of reports from at least one entity in the PLMN to a monitor collection entity in response to said at least one event, wherein the request indicates at least one action to be taken by said at least one entity in response to said at least one event;
      configure at least one profile associated with said at least one user based on the request, wherein the at least one profile is stored in the memory; and
      provide the request to monitor said at least one event associated with said at least one user to at least one serving node associated with said at least one user.

2. The HSS of claim 1, wherein the request to monitor said at least one event associated with said at least one user is received from an element management system (EMS) within the PLMN.

3. The HSS of claim 1, wherein the request to monitor said at least one event associated with said at least one user is from an external entity and validated by an interworking function that supports and controls an interface between the PLMN and non PLMN entities.

4. The HSS of claim 1, wherein the computer system is configured to provide monitoring information indicative of said at least one event associated with said at least one user to said at least one entity in the PLMN or at least one entity in another network.

5. The HSS of claim 1, wherein said at least one user is associated with user equipment that supports at least one machine type communication (MTC) application, and wherein the computer system is configured to receive a request to monitor at least one event associated with the at least one MTC application.

6. The HSS of claim 5, wherein the computer system is configured to receive a request to monitor an event indicating at least one of behavior that is not aligned with an activated MTC feature associated with the at least one MTC application, a change in an association between the user equipment and a smart card, loss of connectivity, a communication failure, a change in geographical position of the user equipment, or a change in a point of attachment of the user equipment.

* * * * *